United States Patent
Luo

(10) Patent No.: US 11,588,518 B2
(45) Date of Patent: Feb. 21, 2023

(54) COMMUNICATION APPARATUS AND METHOD THEREOF

(71) Applicant: Nuvolta Technologies (Hefei) Co., Ltd., Hefei (CN)

(72) Inventor: Zhijun Luo, Shanghai (CN)

(73) Assignee: NuVolta Technologies (Hefei) Co., Ltd., Hefei (CN)

( * ) Notice: Subject to any disclaimer, the term of this patent is extended or adjusted under 35 U.S.C. 154(b) by 45 days.

(21) Appl. No.: 17/324,246

(22) Filed: May 19, 2021

(65) Prior Publication Data

US 2022/0360296 A1     Nov. 10, 2022

(30) Foreign Application Priority Data

May 10, 2021   (CN) .......................... 202110505276.5

(51) Int. Cl.
| | |
|---|---|
| H02J 7/02 | (2016.01) |
| H02J 50/12 | (2016.01) |
| H02J 50/40 | (2016.01) |
| H02J 50/80 | (2016.01) |
| H02J 50/90 | (2016.01) |
| H04B 5/00 | (2006.01) |
| H02J 50/10 | (2016.01) |
| H02M 7/217 | (2006.01) |

(52) U.S. Cl.
CPC .......... *H04B 5/0037* (2013.01); *H02J 50/10* (2016.02); *H02M 7/217* (2013.01)

(58) Field of Classification Search
None
See application file for complete search history.

(56) References Cited

U.S. PATENT DOCUMENTS

| | | | |
|---|---|---|---|
| 9,030,051 B2* | 5/2015 | Muratov | H02J 50/12 |
| | | | 307/104 |
| 9,225,196 B2* | 12/2015 | Huang | H02J 50/80 |
| 9,444,290 B2* | 9/2016 | Chuang | G06K 19/0703 |
| 9,847,652 B2* | 12/2017 | Nakano | H02M 7/217 |
| 9,973,039 B2* | 5/2018 | Morreale | H02J 50/402 |
| 10,044,228 B2* | 8/2018 | Sankar | H02J 50/60 |
| 10,714,976 B2* | 7/2020 | Uchimoto | H02J 50/12 |
| 10,811,913 B2* | 10/2020 | Qiu | H02J 50/40 |
| 11,056,878 B2* | 7/2021 | Gao | H02M 7/217 |
| 11,101,845 B2* | 8/2021 | Teggatz | H02J 7/007 |
| 2021/0083528 A1* | 3/2021 | Stingu | H02J 50/005 |
| 2021/0399582 A1* | 12/2021 | Vasconcelos Araujo | A61M 60/873 |
| 2022/0085662 A1* | 3/2022 | Narayana Bhat | H04B 5/0087 |

* cited by examiner

*Primary Examiner* — Kenneth B Wells
(74) *Attorney, Agent, or Firm* — Slater Matsil, LLP

(57) ABSTRACT

An apparatus includes a rectifier having a first input coupled to a first terminal of a receiver coil and a second input coupled to a second terminal of the receiver coil, wherein the rectifier is configured to convert an alternating current voltage into a direct current voltage, a first communication network connected to the first input of the rectifier, and a second communication network connected to the second input of the rectifier, wherein the first communication network and the second communication network are controlled independently to adjust a gain of a wireless power transfer system.

12 Claims, 4 Drawing Sheets

COMMUNICATION APPARATUS AND METHOD THEREOF

PRIORITY CLAIM

This application claims priority to Chinese Patent Application No. 202110505276.5, filed on May 10, 2021, which is hereby incorporated by reference in its entirety.

TECHNICAL FIELD

The present invention relates to a communication apparatus, and, in particular embodiments, to a communication apparatus in a receiver of a wireless power transfer system.

BACKGROUND

As technologies further advance, wireless power transfer has emerged as an efficient and convenient mechanism for powering or charging battery based mobile devices such as mobile phones, tablet PCs, digital cameras, MP3 players and/or the like. A wireless power transfer system typically comprises a primary side transmitter and a secondary side receiver. The primary side transmitter is magnetically coupled to the secondary side receiver through a magnetic coupling. The magnetic coupling may be implemented as a loosely coupled transformer having a primary side coil formed in the primary side transmitter and a secondary side coil formed in the secondary side receiver.

The primary side transmitter may comprise a power conversion unit such as a primary side of a power converter. The power conversion unit is coupled to a power source and is capable of converting electrical power to wireless power signals. The secondary side receiver is able to receive the wireless power signals through the loosely coupled transformer and convert the received wireless power signals to electrical power suitable for a load.

In a wireless power transfer system, various control signals may be generated based upon the operating parameters at the secondary side receiver. The control signals may be transferred from the secondary side receiver to the primary side transmitter. In particular, the control signals may be transmitted from a receiver coil to a transmitter coil in the form of modulated signals using suitable modulation schemes. Amplitude shift keying (ASK) is a widely used modulation scheme in the receiver of the wireless power transfer system. ASK is carried out through modulating the amplitude of the analog signal in the wireless power transfer system. Information is passed through the amplitude variation of the analog signal. An analog sensing device is employed to detect the control signals, which may be included in the current and/or the voltage applied to the transmission coil. A demodulator at the primary side transmitter may be employed to demodulate the signals detected by the analog sensing device and feed the demodulated signals to a transmitter controller so as to better control the operation of the transmitter.

The communication information may be transferred from the receiver to the transmitter through varying the operating parameters of the transmitter. One relatively simple method to vary the operating parameters of the transmitter is based on an impedance modulation method. For example, a pair of capacitor-switch networks is coupled to two terminals of the receiver coil, respectively. The switches of the pair of capacitor-switch networks are switched on and off during communication so that the impedance coupled to the receiver coil is changed. The impedance variation has an impact on the electrical characteristics of the transmitter. In response to this impact, some operating parameters (e.g., the current flowing through the transmitter coil and/or the voltage across the transmitter coil) may vary. The control circuit in the transmitter detects the variation of at least one operating parameter and retrieves the communication information through demodulating the variation of this operating parameter.

As the power of the wireless power transfer system goes higher, there may be a need for efficiently transferring communication information from the receiver to the transmitter, thereby controlling the operation of the transmitter in a reliable manner.

SUMMARY

These and other problems are generally solved or circumvented, and technical advantages are generally achieved, by preferred embodiments of the present disclosure which provide a communication apparatus in a receiver of a wireless power transfer system.

In accordance with an embodiment, an apparatus comprises a rectifier having a first input coupled to a first terminal of a receiver coil and a second input coupled to a second terminal of the receiver coil, wherein the rectifier is configured to convert an alternating current voltage into a direct current voltage, a first communication network connected to the first input of the rectifier, and a second communication network connected to the second input of the rectifier, wherein the first communication network and the second communication network are controlled independently to adjust a gain of a wireless power transfer system.

In accordance with another embodiment, a method comprises coupling a first communication network between a first input terminal of a rectifier in a receiver of a wireless power transfer system and ground, the first communication network comprising a first capacitor and a first switch, coupling a second communication network between a second input terminal of the rectifier and ground, the second communication network comprising a second capacitor and a second switch, and activating the first communication network and the second communication network independently to induce an operating parameter variation in a transmitter having a transmitter coil magnetically coupled to a receiver coil in the receiver of the wireless power transfer system.

In accordance with yet another embodiment, a system comprises a receiver coil configured to be magnetically coupled to a transmitter coil, a rectifier connected to the receiver coil through a receiver resonant capacitor, a first communication network connected to a first input of the rectifier, and a second communication network connected to a second input of the rectifier, wherein the first communication network and the second communication network are controlled independently to vary an operating parameter of the transmitter coil.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present disclosure provides many applicable inventive concepts that can be embodied in a wide variety of specific contexts. The specific embodiments discussed are merely illustrative of specific ways to make and use the disclosure, and do not limit the scope of the disclosure.

The present disclosure will be described with respect to preferred embodiments in a specific context, namely a communication apparatus in a receiver of a wireless power transfer system. The disclosure may also be applied, however, to a variety of power systems. Hereinafter, various embodiments will be explained in detail with reference to the accompanying drawings.

Figure 1:
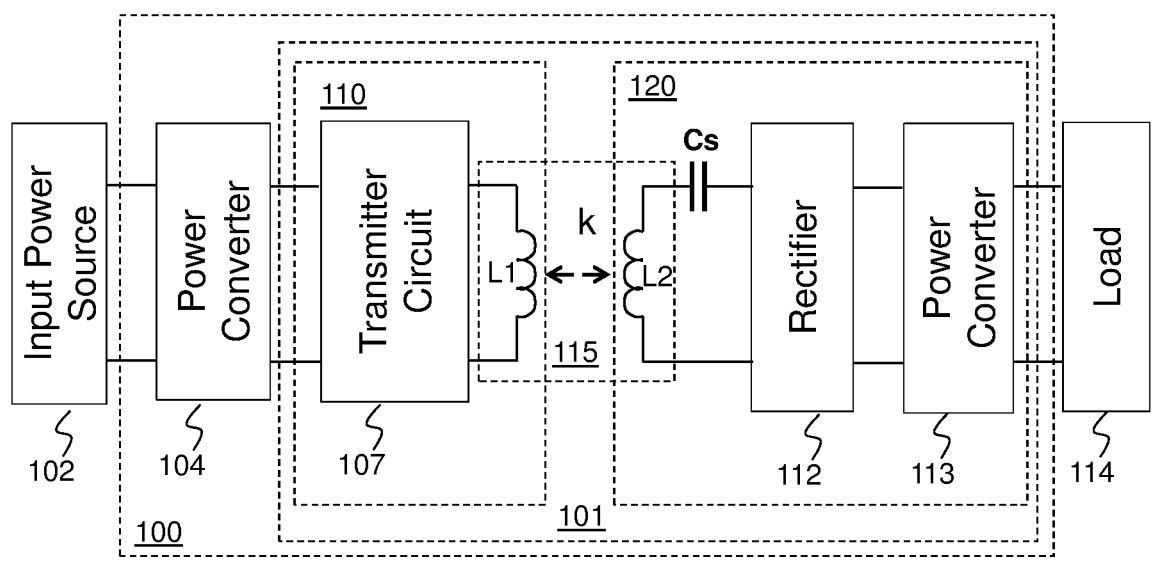
FIG. 1 illustrates a block diagram of a wireless power transfer system in accordance with various embodiments of the present disclosure.

FIG. 1 illustrates a block diagram of a wireless power transfer system in accordance with various embodiments of the present disclosure. The wireless power transfer system 100 comprises a power converter 104 and a wireless power transfer device 101 connected in cascade between an input power source 102 and a load 114. In some embodiments, the power converter 104 is employed to further improve the performance of the wireless power transfer system 100. In alternative embodiments, the power converter 104 is an optional element. In other words, the wireless power transfer device 101 may be connected to the input power source 102 directly.

The wireless power transfer device 101 includes a power transmitter 110 and a power receiver 120. As shown in FIG. 1, the power transmitter 110 comprises a transmitter circuit 107 and a transmitter coil L1 connected in cascade. The input of the transmitter circuit 107 is coupled to an output of the power converter 104. The power receiver 120 comprises a receiver coil L2, a resonant capacitor Cs, a rectifier 112 and a power converter 113 connected in cascade. As shown in FIG. 1, the resonant capacitor Cs is connected in series with the receiver coil L2 and further connected to the inputs of the rectifier 112. The outputs of the rectifier 112 are connected to the inputs of the power converter 113. The outputs of the power converter 113 are coupled to the load 114.

The power transmitter 110 is magnetically coupled to the power receiver 120 through a magnetic field when the power receiver 120 is placed near the power transmitter 110. A loosely coupled transformer 115 is formed by the transmitter coil L1, which is part of the power transmitter 110, and the receiver coil L2, which is part of the power receiver 120. As a result, electrical power may be transferred from the power transmitter 110 to the power receiver 120.

In some embodiments, the power transmitter 110 may be inside a charging pad. The transmitter coil L1 is placed underneath the top surface of the charging pad. The power receiver 120 may be embedded in a mobile phone. When the mobile phone is placed near the charging pad, a magnetic coupling may be established between the transmitter coil L1 and the receiver coil L2. In other words, the transmitter coil L1 and the receiver coil L2 may form a loosely coupled transformer through which a power transfer occurs between the power transmitter 110 and the power receiver 120. The strength of coupling between the transmitter coil L1 and the receiver coil L2 is quantified by the coupling coefficient k. In some embodiments, k is in a range from about 0.05 to about 0.9.

In some embodiments, after the magnetic coupling has been established between the transmitter coil L1 and the receiver coil L2, the power transmitter 110 and the power receiver 120 may form a power system through which power is wirelessly transferred from the input power source 102 to the load 114.

The input power source 102 may be a power adapter converting a utility line voltage to a direct-current (dc) voltage. Alternatively, the input power source 102 may be a renewable power source such as a solar panel array. Furthermore, the input power source 102 may be any suitable energy storage devices such as rechargeable batteries, fuel cells, any combinations thereof and/or the like.

The load 114 represents the power consumed by the mobile device (e.g., a mobile phone) coupled to the power receiver 120. Alternatively, the load 114 may refer to a rechargeable battery and/or batteries connected in series/parallel, and coupled to the output of the power receiver 120. Furthermore, the load 114 may be a downstream power converter such as a battery charger.

The transmitter circuit 107 may comprise primary side switches of a full-bridge converter according to some embodiments. Alternatively, the transmitter circuit 107 may comprise the primary side switches of any other suitable power converters such as a half-bridge converter, a push-pull converter, any combinations thereof and/or the like.

It should be noted that the power converters described above are merely examples. One having ordinary skill in the art will recognize other suitable power converters such as class E topology based power converters (e.g., a class E amplifier), may alternatively be used depending on design needs and different applications.

The transmitter circuit 107 may further comprise a resonant capacitor (not shown). The resonant capacitor and the magnetic inductance of the transmitter coil may form a resonant tank. Depending on design needs and different applications, the resonant tank may further include a resonant inductor. In some embodiments, the resonant inductor may be implemented as an external inductor. In alternative embodiments, the resonant inductor may be implemented as a connection wire.

The power receiver 120 comprises the receiver coil L2 magnetically coupled to the transmitter coil L1 after the power receiver 120 is placed near the power transmitter 110. As a result, power may be transferred to the receiver coil and further delivered to the load 114 through the rectifier 112. The power receiver 120 may comprise a secondary resonant capacitor Cs as shown in FIG. 1. Throughout the description, the secondary resonant capacitor Cs may be alternatively referred to as a receiver resonant capacitor.

Figure 2:
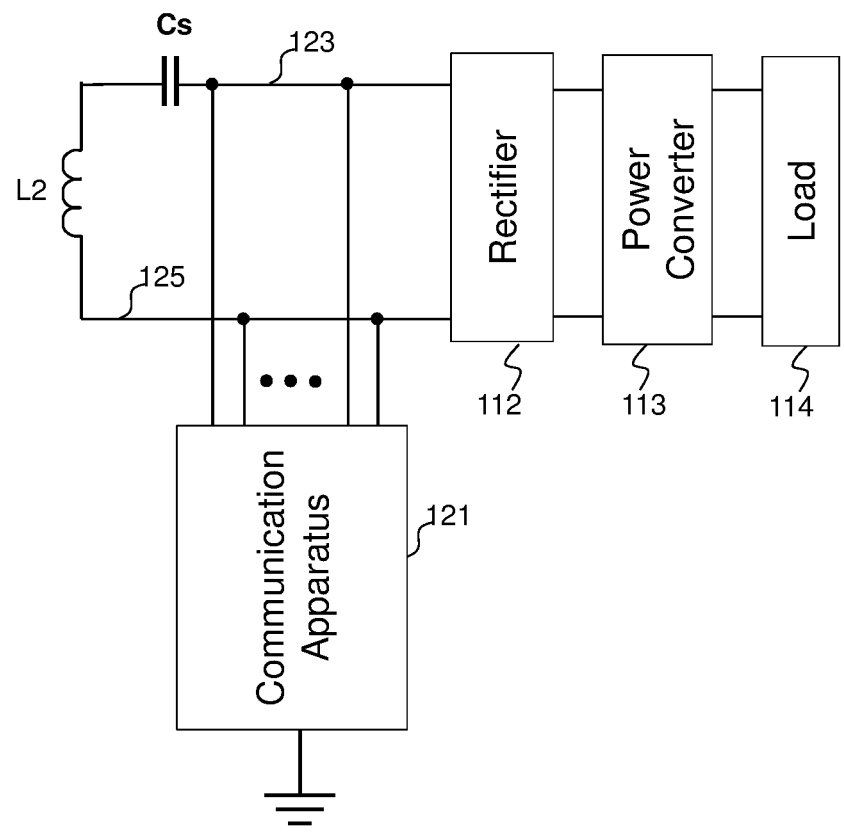
FIG. 2 illustrates a block diagram of the receiver shown in FIG. 1 in accordance with various embodiments of the present disclosure.

The power receiver 120 may further comprise a communication apparatus (not shown but illustrated in FIG. 2). The communication apparatus comprises a plurality of first capacitor-switch networks and a plurality of second capacitor-switch networks. The plurality of first capacitor-switch networks is connected in parallel between a first input terminal of the rectifier 112 and ground. The plurality of second capacitor-switch networks is connected in parallel between a second input terminal of the rectifier 112 and ground.

The rectifier 112 converts an alternating polarity waveform received from the resonant tank comprising the receiver coil L2 and the receiver resonant capacitor Cs to a single polarity waveform. In some embodiments, the rectifier 112 comprises a full-wave diode bridge and an output capacitor. In alternative embodiments, the full-wave diode bridge may be replaced by a full-wave bridge formed by switching elements such as n-type metal oxide semiconductor (NMOS) transistors.

Furthermore, the rectifier 112 may be formed by other types of controllable devices such as metal oxide semiconductor field effect transistor (MOSFET) devices, bipolar junction transistor (BJT) devices, super junction transistor (SJT) devices, insulated gate bipolar transistor (IGBT) devices, gallium nitride (GaN) based power devices and/or the like. The detailed operation and structure of the rectifier 112 are well known in the art, and hence are not discussed herein.

The power converter 113 is coupled between the rectifier 112 and the load 114. The power converter 113 is a non-isolated power converter. In some embodiments, the power converter 113 is implemented as a step-down power converter such as a buck converter. In alternative embodiments, the power converter 113 is implemented as a four-switch buck-boost power converter.

Furthermore, the power converter 113 may be implemented as a hybrid power converter. The hybrid converter is a non-isolated power converter. By controlling the on/off of the switches of the hybrid converter, the hybrid converter can be configured as a buck converter, a charge pump converter or a hybrid converter.

Depending on design needs and different applications, the hybrid converter may operate in different operating modes. More particularly, the hybrid converter may operate in a buck mode when the load current is less than a predetermined current threshold and/or the input voltage is less than a predetermined voltage threshold. In the buck mode, the hybrid converter is configured as a buck converter. The hybrid converter may operate in a charge pump mode or a hybrid mode when the input voltage is greater than the predetermined voltage threshold and/or the load current is greater than the predetermined current threshold. More particularly, in some embodiments, the hybrid converter may operate in a charge pump mode or a hybrid mode when a ratio of the output voltage of the hybrid converter to the input voltage of the hybrid converter is less than 0.5. In the charge pump mode, the hybrid converter is configured as a charge pump converter. In the hybrid mode, the hybrid converter is configured as a hybrid converter.

In some embodiments, the hybrid converter comprises a first switch, a capacitor and a second switch connected in series between the output of the rectifier 112 and the input of the load 114. The hybrid converter further comprises a third switch and a fourth switch. The third switch is connected between a common node of the first switch and the capacitor, and a common node of the second switch and the output terminal of the hybrid converter. The fourth switch is connected between a common node of the capacitor and the second switch, and ground.

Moreover, the power converter 113 may comprise a first power stage and a second power stage connected in cascade. The first power stage is configured to operate in different modes for efficiently charging the load 114 (e.g., a rechargeable battery). In some embodiments, the first stage may be implemented as a step-down power converter (e.g., a buck converter), a four-switch buck-boost converter, a hybrid converter and any combinations thereof. The second power stage is configured as a voltage divider or an isolation switch.

FIG. 2 illustrates a block diagram of the receiver shown in FIG. 1 in accordance with various embodiments of the present disclosure. As shown in FIG. 2, the receiver coil L2 and the receiver resonant capacitor Cs are connected in series. The receiver coil L2 is configured to be magnetically coupled to a transmitter coil (not shown). The receiver resonant capacitor Cs and the receiver coil L2 form a receiver resonant tank.

The two inputs of the rectifier 112 are connected to the receiver coil L2 and the receiver resonant capacitor Cs respectively. More particularly, a first input of the rectifier 112 is connected to the receiver resonant capacitor Cs through a first bus 123. A second input of the rectifier 112 is connected to the receiver coil L2 through a second bus 125. The outputs of the rectifier 112 are connected to the inputs of the power converter 113. The outputs of the power converter 113 are connected to the load 114.

As shown in FIG. 2, a communication apparatus 121 is connected between the inputs of the rectifier 112 and ground. More particularly, the communication apparatus 121 has a plurality of first terminals connected to the first bus 123, and a plurality of second terminals connected to the second bus 125. The detailed schematic diagram of the communication apparatus 121 will be described below with respect to FIG. 3.

In some embodiments, the communication apparatus 121 comprises a plurality of capacitor-switch networks. Each of the plurality of capacitor-switch networks is controlled independently. In operation, the receiver is configured to send a plurality of control signals (communication information) to the transmitter magnetically coupled to the receiver. The control signals are transmitted through suitable modulation schemes such as amplitude shift keying (ASK). The ASK modulation scheme may be implemented by adjusting the impedance coupled to the receiver coil L2. As a result of adjusting the impedance coupled to the receiver coil L2, the gain of the wireless power transfer system varies accordingly. The controller on the transmitter side detects the variation of the gain through analyzing the current flowing through the transmitter coil and/or the voltage across the transmitter coil. The variation of the gain can be demodulated to retrieve the control signals sent from the receiver.

In a conventional communication apparatus, a pair of capacitor-switch networks is coupled to a first terminal and a second terminal of the receiver coil respectively. The two switches of the pair of capacitor-switch networks are controlled by a same control signal. In other words, these two switches are not controlled independently. The two switches of the pair of capacitor-switch networks are turned on and off simultaneously. With such a control mechanism, a pair of capacitor-switch networks can only generate two different impedance variations. In particular, when both switches are turned off, a first impedance arrangement is applied to the receiver coil. On the other hand, when both switches are turned on, a second impedance arrangement is applied to the receiver coil. In order to have more impedance variations, the conventional communication apparatus requires more capacitor-switch networks.

In contrast, a pair of capacitor-switch networks in the communication apparatus 121 shown in FIG. 2 can generate three or four different impedance variations. In particular, when both switches are turned off, a first impedance arrangement is applied to the receiver coil. When a first switch is turned on and a second switch is turned off, a second impedance arrangement is applied to the receiver coil. When a first switch is turned off and a second switch is turned on, a third impedance arrangement is applied to the receiver coil. When both switches are turned on, a fourth impedance arrangement is applied to the receiver coil. As such, the communication apparatus 121 shown in FIG. 2 can efficiently and accurately transfer communication information from the receiver to the transmitter. It should be noted that when the pair of capacitor-switch networks has the same capacitance value, the pair of capacitor-switch networks can generate three different impedance variations. On the other hand, when the pair of capacitor-switch networks has different capacitance values, the pair of capacitor-switch networks can generate four different impedance variations. The detailed structure and operating principle of the communication apparatus 121 will be discussed below with respect to FIG. 3.

Figure 3:
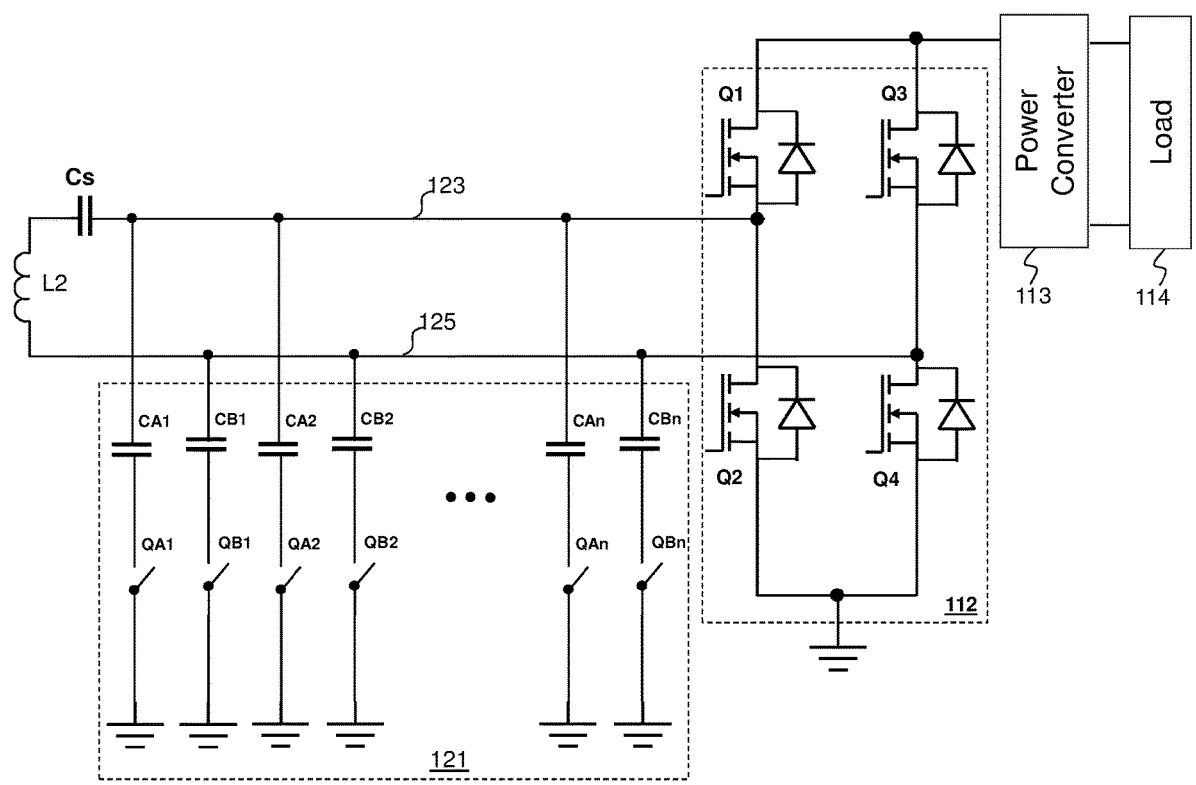
FIG. 3 illustrates a schematic diagram of the communication apparatus shown in FIG. 2 in accordance with various embodiments of the present disclosure.

FIG. 3 illustrates a schematic diagram of the communication apparatus of the receiver shown in FIG. 2 in accordance with various embodiments of the present disclosure. The receiver comprises the receiver coil L2, the receiver resonant capacitor Cs, the rectifier 112 and the power converter 113. As shown in FIG. 3, the receiver resonant capacitor Cs, the rectifier 112 and the power converter 113 are connected in cascade between the receiver coil L2 and the load 114. The receiver further comprises the communication apparatus 121 coupled to the first bus 123 and the second bus 125.

The rectifier 112 converts an alternating polarity waveform received from the outputs of the receiver coil L2 to a single polarity waveform. The power converter 113 is employed to further adjust the voltage/current applied to the load 114. The resonant capacitor Cs helps to achieve soft switching for the wireless power transfer system.

In some embodiments, the rectifier 112 is implemented as a synchronous rectifier. The rectifier 112 includes four switching elements, namely Q1, Q2, Q3 and Q4. As shown in FIG. 3, the switching elements Q1 and Q2 are connected in series between the output terminal of the rectifier 112 and ground. Likewise, the switching elements Q3 and Q4 are connected in series between the output terminal of the rectifier 112 and ground. As shown in FIG. 3, the common node of the switching elements Q1 and Q2 is coupled to a first terminal of the receiver coil L2 through the resonant capacitor Cs. The common node of the switching elements Q3 and Q4 is coupled to a second terminal of the receiver coil L2.

According to some embodiments, the switching elements of the rectifier 112 are implemented as MOSFET or MOSFETs connected in parallel, any combinations thereof and/or the like.

It should be noted that while the example throughout the description is based upon a full-wave rectifier (e.g., rectifier 112 shown in FIG. 3), the implementation of the receiver shown in FIG. 3 may have many variations, alternatives, and modifications. For example, half-wave rectifiers may be alternatively employed.

In sum, the rectifier 112 illustrated herein is limited solely for the purpose of clearly illustrating the inventive aspects of the various embodiments. The present disclosure is not limited to any particular power topology.

The communication apparatus 121 comprises a plurality of capacitor-switch networks. The plurality of capacitor-switch networks can be categorized into two groups. A plurality of first capacitor-switch networks is connected in parallel between the first bus 123 and ground. A plurality of second capacitor-switch networks is connected in parallel between the second bus 125 and ground. The plurality of first capacitor-switch networks and the plurality of second capacitor-switch networks are controlled independently to change the impedance coupled to the receiver coil L2 so as to vary the operating parameters in the transmitter (e.g., the current flowing through the transmitter coil and/or the voltage across the transmitter coil).

The impedance coupled to the receiver coil L2 can be adjusted through switching on and off of the plurality of capacitor-switch networks. As a result of adjusting the impedance coupled to the receiver coil L2, the gain of the wireless power transfer system varies accordingly. Furthermore, in response to the variation of the gain of the wireless power transfer system, the operating parameters in the transmitter (e.g., the current flowing through the transmitter coil and/or the voltage across the transmitter coil) may vary accordingly. The control circuit in the transmitter is able to retrieve the communication information sent from the receiver based on demodulating the change of the operating parameters. The plurality of capacitor-switch networks shown in FIG. 3 functions as a plurality of communication networks. Throughout the description, the plurality of capacitor-switch networks may be alternatively referred to as a plurality of communication networks.

As shown in FIG. 3, a first communication network is connected between the first input (bus 123) of the rectifier 112 and ground. The first communication network comprises a first capacitor CA1 and a first switch QA1 connected in series between the first input of the rectifier and ground. A second communication network is connected to the second input (bus 125) of the rectifier and ground. The second communication network comprises a second capacitor CB1 and a second switch QB1 connected in series between the second input of the rectifier and ground. In some embodiments, a capacitance value of the first capacitor CA1 is equal to a capacitance value of the second capacitor CB1. In alternative embodiments, a capacitance value of the first capacitor CA1 is different from a capacitance value of the second capacitor CB1.

For a low power wireless power transfer system (e.g., a 5 W wireless power transfer system), a pair of capacitor-switch networks (e.g., CA1/QA1 and CA2/QA2) can provide a suitable impedance variation to achieve an accurate and reliable communication between the receiver and the transmitter. In operation, the first switch QA1 and the second switch QB1 are configured such that four different impedance circuits are coupled to the receiver coil L2. The impedance coupled to the receiver coil L2 varies depending on which impedance circuit is coupled to the receiver coil L2. A first impedance circuit is coupled to the receiver coil L2 after the first switch QA1 and the second switch QB1 are configured to be turned off. A second impedance circuit is coupled to the receiver coil L2 after the first switch QA1 is configured to be turned on and the second switch QB1 is configured to be turned off. A third impedance circuit is coupled to the receiver coil L2 after the first switch QA1 is configured to be turned off and the second switch QB1 is configured to be turned on. A fourth impedance circuit is coupled to the receiver coil L2 after the first switch QA1 and the second switch QB1 are configured to be turned on. It should be noted that the pair of capacitor-switch networks (e.g., CA1/QA1 and CA2/QA2) may generate three or four different impedance variations depending on the values of CA1 and CA2. When the capacitance value of CA1 is equal to that of CA2, the pair of capacitor-switch networks can generate three different impedance variations. On the other hand, when the capacitance value of CA1 is different from that of CA2, the pair of capacitor-switch networks can generate four different impedance variations.

In some embodiments, more capacitor-switch networks are necessary for a high power wireless power transfer system. For example, in a 5 W wireless power transfer system, a pair of capacitor-switch networks can provide a suitable impedance variation to achieve the communication between the receiver and the transmitter. In a 15 W wireless power transfer system, two pairs of capacitor-switch networks can provide a suitable impedance variation to achieve the communication between the receiver and the transmitter. In a 60 W wireless power transfer system, three pairs of capacitor-switch networks can provide a suitable impedance variation to achieve the communication between the receiver and the transmitter. In an 80 W wireless power transfer system, four pairs of capacitor-switch networks can provide a suitable impedance variation to achieve the communication between the receiver and the transmitter.

The communication apparatus 121 comprises more capacitor-switch networks for high power applications. As shown in FIG. 3, a third communication network is connected to the first input (bus 123) of the rectifier and ground. The third communication network comprises a third capacitor CA2 and a third switch QA2 connected in series between the first input of the rectifier and ground. A fourth communication network connected to the second input (bus 125) of the rectifier and ground. The fourth communication network comprises a fourth capacitor CB2 and a fourth switch QB2 connected in series between the second input of the rectifier and ground. The third communication network and the fourth communication network are controlled independently to adjust the gain of the wireless power transfer system.

In operation, the first communication network, the second communication network, the third communication network and the fourth communication network are controlled independently to induce the operating parameter variation in the transmitter. More particularly, the first switch QA1, the second switch QB1, the third switch QA2 and the fourth switch QB2 are configured such that sixteen different impedance circuits are coupled to the receiver coil L2. For example, the capacitance value of CA1 is 5 uF. The capacitance value of CB1 is 10 uF. The capacitance value of CA2 is 20 uF. The capacitance value of CB2 is 40 uF. By configuring the on and off of QA1, QB1, QA2 and QB2, the following sixteen capacitance values (representing different impedance circuits) can be obtained: 0 uF; 5 uF; 10 uF; 15 uF; 20 uF; 25 uF; 30 uF; 35 uF; 40 uF; 45 uF; 50 uF; 55 uF; 60 uF; 65 uF; 70 uF and 75 uF.

The communication apparatus 121 comprises more communication networks (e.g., CAn/QAn and CBn/QBn) as shown in FIG. 3. The operating principle of these communication networks is similar to that of the communication networks (e.g., CA1/QA1 and CB1/QB1) described above, and hence is not discussed herein.

It should be noted the switches QA1, QB1, QA2, QB2, QAn and QBn may be implemented as MOSFETs. In some embodiments, the gate drive voltages of these switches may be adjusted so that each switch may function as a resistor. As such, each communication network becomes a capacitor-resistor network. Each communication network comprises one more control variable, namely the resistance of the switch. The resistance of the switch is dynamically adjustable through adjusting the corresponding gate drive voltage. As a result, the switch and the capacitor form a dynamically adjustable impedance network coupled to the receiver coil.

Figure 4:
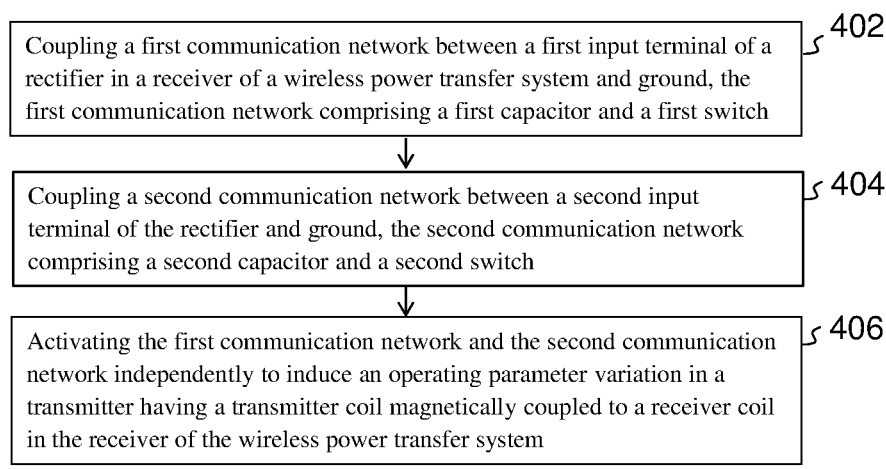
FIG. 4 illustrates a flow chart of applying a communication control mechanism to the receiver shown in FIG. 3 in accordance with various embodiments of the present disclosure.

FIG. 4 illustrates a flow chart of applying a communication control mechanism to the receiver shown in FIG. 3 in accordance with various embodiments of the present disclosure. This flowchart shown in FIG. 4 is merely an example, which should not unduly limit the scope of the claims. One of ordinary skill in the art would recognize many variations, alternatives, and modifications. For example, various steps illustrated in FIG. 4 may be added, removed, replaced, rearranged and repeated.

A wireless power transfer system (e.g., wireless power transfer system shown in FIG. 1) comprises a transmitter and a receiver. The transmitter comprises a full bridge, a transmitter resonant capacitor and a transmitter coil. The receiver comprises a receiver coil, a receiver resonant capacitor and a rectifier. The transmitter coil is magnetically coupled to the receiver coil. The wireless power transfer system may further comprise a communication apparatus placed in the receiver. The communication apparatus comprises a plurality of communication networks. Each communication network comprises a capacitor and a switch connected in series.

At step 402, a first communication network is configured to be coupled between a first input terminal of the rectifier in the receiver of the wireless power transfer system and ground. The first communication network comprises a first capacitor and a first switch connected in series.

At step 404, a second communication network is configured to be coupled between a second input terminal of the rectifier and ground. The second communication network comprises a second capacitor and a second switch connected in series.

At step 406, the first communication network and the second communication network are activated or controlled independently to induce an operating parameter variation in the transmitter. The transmitter comprises the transmitter coil magnetically coupled to the receiver coil in the receiver of the wireless power transfer system.

Although embodiments of the present disclosure and its advantages have been described in detail, it should be understood that various changes, substitutions and alterations can be made herein without departing from the spirit and scope of the disclosure as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. An apparatus comprising:
a rectifier having a first input coupled to a first terminal of a receiver coil and a second input coupled to a second terminal of the receiver coil, wherein the rectifier is configured to convert an alternating current voltage into a direct current voltage;
a first communication network connected to the first input of the rectifier;
a second communication network connected to the second input of the rectifier, wherein a capacitance value of the first communication network is equal to one half of a capacitance value of the second communication network;
a third communication network connected to the first input of the rectifier, wherein the capacitance value of the second communication network is equal to one half of a capacitance value of the third communication network;
a fourth communication network connected to the second input of the rectifier, wherein a capacitance value of the third communication network is equal to one half of a capacitance value of the fourth communication network, and wherein:
the first communication network and the second communication network are placed adjacent to each other, and form a first pair of capacitor-switch networks;
the first communication network and the second communication network are controlled independently to adjust a gain of a wireless power transfer system, and wherein, as a result of independently controlling the first communication network and the second communication network, the first communication network and the second communication network generate four different impedance variations;
the third communication network and the fourth communication network are placed adjacent to each other, and form a second pair of capacitor-switch networks; and
the third communication network and the fourth communication network are controlled independently to adjust the gain of the wireless power transfer system, and wherein, as a result of independently controlling the third communication network and the fourth communication network, the third communication network and the fourth communication network generate four different impedance variations.

2. The apparatus of claim 1, wherein:
the wireless power transfer system comprises a transmitter comprising a transmitter coil and a receiver comprising the receiver coil magnetically coupled to the transmitter coil; and
the rectifier comprising a first leg and a second leg, and wherein:
the first leg comprises a first rectifier switch and a second rectifier switch connected in series; and
the second leg comprises a third rectifier switch and a fourth rectifier switch connected in series.

3. The apparatus of claim 2, wherein:
a common node of the first rectifier switch and the second rectifier switch is connected to the first terminal of the receiver coil through a resonant capacitor; and
a common node of the third rectifier switch and the fourth rectifier switch is connected to the second terminal of the receiver coil.

4. The apparatus of claim 1, wherein:
the first communication network comprises a first capacitor and a first switch connected in series between the first input of the rectifier and ground; and
the second communication network comprises a second capacitor and a second switch connected in series between the second input of the rectifier and ground.

5. The apparatus of claim 4, wherein:
the first switch and the second switch are independently controlled such that gate drive voltages of the first switch and the second switch are adjusted to configure each switch as a resistor.

6. The apparatus of claim 5, wherein:
the first switch and the second switch are independently controlled such that a resistance value of each switch is dynamically adjustable through adjusting a corresponding gate drive voltage, and wherein, the resistor and a corresponding capacitor form a dynamically adjustable impedance network coupled to the receiver coil.

7. The apparatus of claim 6, wherein:
a first impedance circuit is coupled to the receiver coil after the first switch and the second switch are configured to be turned off;
a second impedance circuit is coupled to the receiver coil after the first switch is configured to be turned on and the second switch is configured to be turned off;
a third impedance circuit is coupled to the receiver coil after the first switch is configured to be turned off and the second switch is configured to be turned on; and
a fourth impedance circuit is coupled to the receiver coil after the first switch and the second switch are configured to be turned on.

8. The apparatus of claim 1, wherein:
the third communication network comprises a third capacitor and a third switch connected in series between the first input of the rectifier and ground; and
the fourth communication network comprises a fourth capacitor and a fourth switch connected in series between the second input of the rectifier and ground.

9. A system comprising:
a receiver coil configured to be magnetically coupled to a transmitter coil;
a rectifier connected to the receiver coil through a receiver resonant capacitor;
a first communication network connected to a first input of the rectifier;
a second communication network connected to a second input of the rectifier;
a third communication network connected to the first input of the rectifier; and
a fourth communication network connected to the second input of the rectifier, wherein the first communication network, the second communication network, the third communication network and the fourth communication network are controlled independently to vary an operating parameter of the transmitter coil, and wherein:

a capacitance value of the first communication network is equal to one half of a capacitance value of the second communication network;

the capacitance value of the second communication network is equal to one half of a capacitance value of the third communication network; and the capacitance value of the third communication network is equal to one half of a capacitance value of the fourth communication network, and wherein the first communication network, the second communication network, the third communication network and the fourth communication network are controlled to generate sixteen different capacitance values.

10. The system of claim 9, wherein:

the first communication network comprises a first capacitor and a first switch connected in series between the first input of the rectifier and ground; and the second communication network comprises a second capacitor and a second switch connected in series between the second input of the rectifier and ground.

11. The system of claim 9, further comprising:

a plurality of first capacitor-switch networks connected in parallel with the first communication network; and a plurality of second capacitor-switch networks connected in parallel with the second communication network.

12. The system of claim 11, wherein:

the plurality of first capacitor-switch networks and the plurality of second capacitor-switch networks are controlled independently to vary the operating parameter of the transmitter coil.

\* \* \* \* \*